M. P. SARFATY.
ELECTRIC FAN TRACTOR.
APPLICATION FILED SEPT. 29, 1913.
1,102,087.
Patented June 30, 1914.
2 SHEETS—SHEET 1.
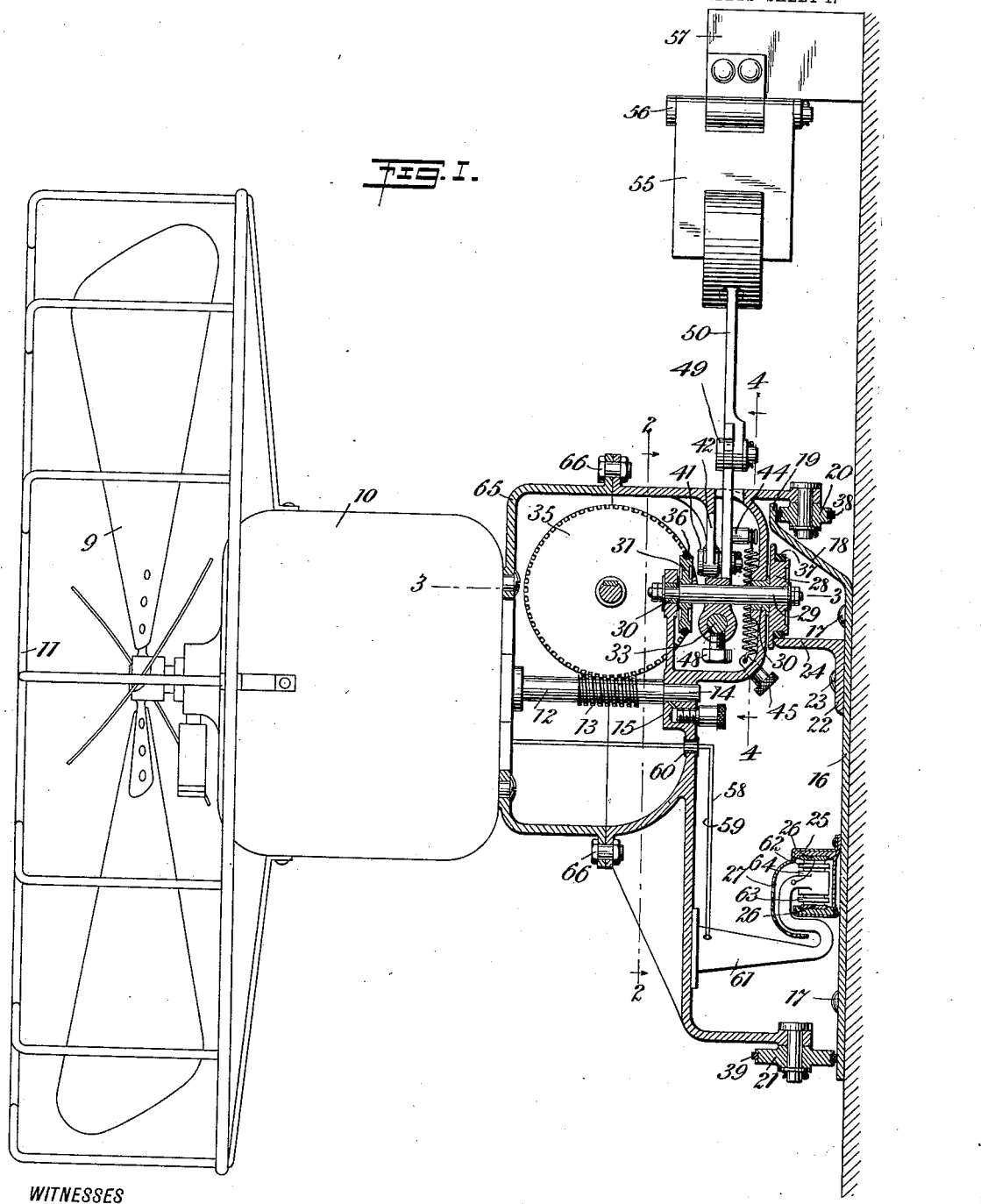
FIG. I.
WITNESSES
G. Robert Thomas
INVENTOR
Morton P. Sarfaty
BY Munn & Co
ATTORNEYS

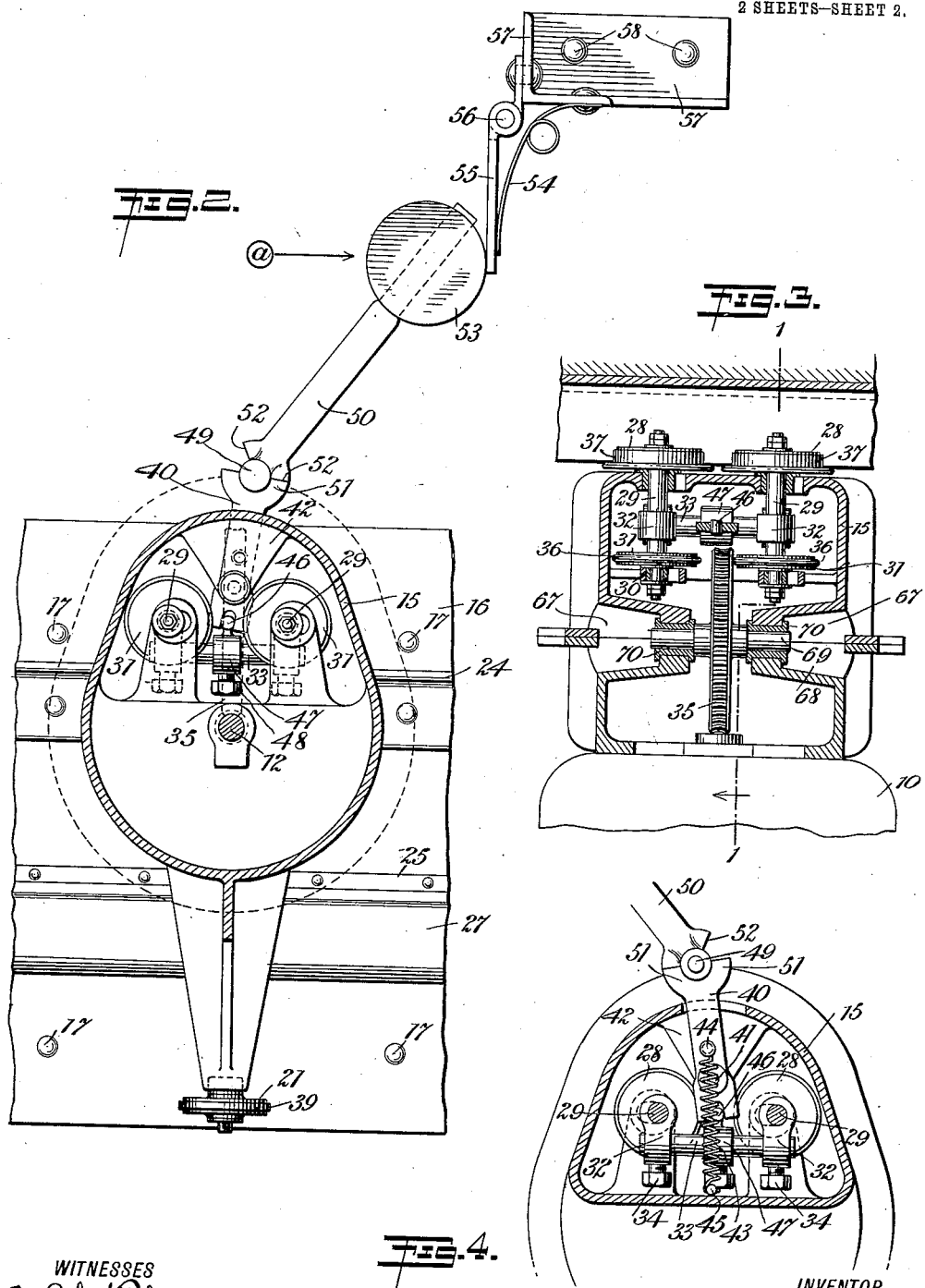

UNITED STATES PATENT OFFICE.

MORTON P. SARFATY, OF NEW YORK, N. Y.

ELECTRIC-FAN TRACTOR.

1,102,087.  Specification of Letters Patent.  Patented June 30, 1914.

Application filed September 29, 1913. Serial No. 792,502.

*To all whom it may concern:*

Be it known that I, MORTON P. SARFATY, a citizen of the United States, and a resident of the city of New York, borough of Manhattan, in the county and State of New York, have invented a new and Improved Electric-Fan Tractor, of which the following is a full, clear, and exact description.

Among the principal objects which the present invention has in view are: to convey a fan of the character mentioned, so as to move the air in an apartment in layers or stratas, by imparting parallel impulses thereto; to provide an automatic mechanism for moving a fan of the character mentioned to operate in an ascertained plane and in a constant direction; to provide automatic means for reversing the direction of travel of said fan at the terminals of its operating zone; to provide a tractor for supporting and moving said fan in the manner mentioned; and to provide a simple, economical and efficient construction for said tractor.

In the drawings, Figure 1 is a vertical cross section of a tractor constructed and arranged in accordance with the present invention, the section being taken as on the line 1—1 in Fig. 3; Fig. 2 is a vertical longitudinal section taken as on the line 2—2 in Fig. 1; Fig. 3 is a horizontal section taken as on the line 3—3 in Fig. 1; Fig. 4 is a vertical longitudinal section taken as on the line 4—4 in Fig. 1.

As seen in the accompanying drawings, a rotary fan 9 is mounted on the rotor shaft of an electric motor 10, within a protected cage 11 provided therefor. The fan, motor, and cage are of conventional arrangement and construction, except that the rotor shaft 12 thereof is elongated and rearwardly projected to support a worm 13, which is rigidly secured upon, or integrally formed upon said shaft. The outer end of the shaft is reduced to form a pintle 14, which is seated in bearings in the frame 15 of the tractor which carries said fan and motor.

The frame 15 is supported in service upon a wall track plate 16. The plate 16 is secured in service by suitable fastening devices, such as screws. The upper edge of the plate 16 is bent to form an outwardly-inclined flange 18, the outer edge of which is upturned to form a track edge 19, against which guide wheels 20 bear. Adjacent the lower edge of the plate 16 is provided a track for a guide wheel 21. Intermediate the upper and lower edges of the plate 16, an angle-bar 22 is secured by fasteners 23, the horizontal extension of which bar forms a supporting track bench 24. The plate 16 and bar 22 connected therewith are installed in an apartment as a permanent fixture. The tractor and fan connected therewith may be readily and easily removed from said plate.

Permanently attached to the plate 16 is a conduit 25, preferably constructed of hard rubber, though fiber or other suitable material may be substituted therefor. The conduit 25 is shaped to form a channel, wherein are mounted electric conductors 26. The conductors 26 are formed of copper strips, and are suitably connected to terminals of a suitable electric circuit. The conduit 25 is provided with a protective apron 27, shaped in cross section as seen in Fig. 1 of the drawings, to avoid a direct entrance to the interior of said conduit. By this construction, there is avoided any danger of accidental short-circuiting of the current in the conductors 26.

The weight of the tractor, motor and fan, and parts connected therewith primarily rests on driving wheels 28. The wheels 28 are each mounted on one of the shafts 29. The shafts 29 are mounted in bearings formed in sliding blocks 30. The driving wheels 28 and friction wheels 31 are non-rotatively mounted on the shafts 29. The shafts 29 are rotatively mounted in bearings formed in adjustable brackets 32. The brackets 32 are held fixedly on a connecting shaft 33 by set screws 34. The brackets 32 and shaft 33 constitute a shifting couple, by which the wheels 28 are successively moved to frictionally engage a large worm gear wheel 35, to secure which engagement the wheels 28 are provided with a rubber or friction tire 36. The wheels 28 are similarly provided, for a similar purpose, with a frictional tire 37, as best seen in Fig. 1 of the drawings. The wheels 20 are equipped with a cushion tire 38, and the wheel 21 with a similar tire 39, to deaden the sound of the tractor when moving lengthwise of the track plate 16.

From the foregoing, it will be seen that when the motor 10 is energized and the fan and rotor shaft 12 of said motor are driven, the worm 13 transmits a relatively diminished rate of rotation to the worm gear wheel 35. The paths of the wheels 31 on the wheel 35 are relatively greater than the circumference of said wheels 31. Therefore, the rate of rotation of the shaft 29 and wheels 28 is again reduced in transmission, with the result that the relative rate of travel of the tractor on the bench 24 is slow and steady.

To shift the couple or the wheels 31, there is provided a rocking lever 40, which is pivoted by means of a pin 41 in a bracket 42. The lever 40 is held in shifted position to exert a pressure by one of the wheels 31 on the wheel 35, by means of a spring 43, the ends of which are anchored to a pin 44 on the lever 42 above the pin 41, and to the eyeleted end of a set screw 45 adjustably mounted in the frame 15. The lever 40 is bifurcated at its lower end, to engage a T-head 46 of a collar 47. The collar 47 is held fixedly in adjusted position on the shaft 33 by a set screw 48. It will be understood that the pressure of the different wheels 31 upon the wheel 35 may be relatively varied by shifting the collar 47.

The lever 40 is pivotally connected by a hinge pin 49, with a weighted arm 50. The arm 50 is loosely held on the lever 40 to rest successively upon the square surface of the flared head 51 of said lever 40. To rest on said squared surface, the end of the arm 50 is cut away and trued to form shoulders 52. By inclining the shoulders 52, as best seen in Fig. 2 of the drawings, the arm 50 is held in angular relation to the lever 40 and generally in a position which may be termed an advance of the angle to said lever when in service position. The purpose primarily of this construction is to permit the weight 53, to augment the pressure imparted by the spring 43 on the wheel 31 which is at any time engaged with the wheel 35. A secondary object is to permit each of the springs 54 to press each of the gates 55 upon the weight 53, to exert a downward pressure upon the arm 50, to rock the lever 40 when the tractor is at what may be termed the reversing position of its travel.

There are two gates 55, one disposed at each end of the travel of the tractor. Each gate is held in substantially vertical position by the springs 54. The gates are pivoted by means of hinge pins 56 to brackets 57. The brackets are secured by fasteners 58 to the standing structure on which the track plate 16 is mounted, and in properly spaced relation thereto above the same. Said gates are free to move away from the springs 54 to clear the weighted end of the arm 50.

As seen in Fig. 2 of the drawings, the tractor is moving in the direction indicated by the arrow $a$. In this position, the arm 50 and weight 53 thereof are shown at the moment of engaging the gate 55. The continuing travel of the tractor operates to swing the arm 50 and weight 53 carried thereby on the pin 49, first to a vertical position. When the center of gravity of the weight 53 passes above the center of gravity of the pin 49, the weighted arm 50 falls to a position opposite that shown in Fig. 2, or on the reverse side of the vertical plane passing through the center of the pin 41. The lever 40 is drawn to and locked against vibration by the spring 43, which, in correspondence to the swing of the lever 40, passes to the opposite side of the center of the pin 41 in a manner well understood.

It will now be observed that if the tractor is carried beyond the desired limit of its travel, the gate 55, while yielding to the weight 53, is pressed in increased degree downward by the spring 54, and that through the arm 50 and lever 40, the shaft 33 and wheels 31 are moved to press with increased firmness one of said wheels against the side of the wheel 35. The engagement referred to operates to reverse the rotary direction of the wheels 28, and to consequently reverse the direction of travel of the tractor.

It will be understood that the length of the track plate 16 and track bench 24 may be varied, and that the brackets 59 and gates 55 attached thereto may be placed at any intervals thereon.

To take the electric current from the conductors 26, circuit wires 58 and 59 are carried from the motor through insulating bushings 60 in the frame 15, and through a goose-necked boot 61 constructed of insulating material, to yielding contacts 62 and 63, respectively. Said contacts are provided with plungers slidingly mounted in a cylindrical collar 64, within which they are held apart by a suitable spring. Said spring operates to press said contacts against their respective conductors 26. The wires 58 and 59 are connected with the contacts 62 and 63, respectively and in any suitable manner. A controlling switch of conventional form is employed to control the electric circuit for energizing the motor 10.

For convenience of assemblage, and to simplify the construction, the frame 15 is provided with a cap 65, which is secured to said frame by means of bolts 66, as best seen in Fig. 1 of the drawings. The cap and frame are each provided with pressed sections 67 and 68, respectively, extending inward from the side of the frame and cap toward the wheel 35, to shorten the length of the shaft 69 thereof. The ends of the shaft 69 are reduced to fit bearings in blocks 70.

From the foregoing, it will be seen that when desired, the tractor, motor, and fan connected therewith may be lifted from the plate 16, care being first exercised to remove the apron 27 of the conduit 25 so that the end of the boot 61 is free for withdrawal from the conduit 25. All that is necessary in thus lifting the tractor from the plate 16 and bench 24, is to cant said tractor so that the wheels 20 and 28 clear the outer edge of the flange 18. Reverse action is all that is required when installing the tractor.

When in operation, the tractor and fan carried thereby move between the gates 55 disposed at the opposite ends of the path of travel, and by each gate, the arm 50 and weight 53 carried thereby are thrown to reverse the transmission from the wheel 35 to the wheels 28, thereby reversing the direction of travel of the tractor. Thus, the tractor is operated to move back and forth over a relatively large area in a given plane and in a constant direction. The net result of the action of the fan is to establish a current of air in the apartment where it is installed, in a given and uniform direction, as contra-distinguished from the operation of the rotary fan, which agitates the air by radiating it from a given center. The strength of the current of air established by the fan mounted upon the tractor herein described is directly proportioned to the length of travel of said tractor.

It will be understood that more than one tractor and fan may be operated on the same track plate, the gates 55 being suitably disposed to prevent interference of the tractors, and overlapping of the areas of operation of said fans.

Claims.

1. A tractor as characterized, comprising a supporting frame; carrying wheels mounted in said frame; a transmission mechanism embodying a power-driven shaft, a continuous rotary driving wheel operatively connected with said shaft, and friction wheels oppositely-disposed relative said driving wheel and operatively connected with said carrying wheels; a shifting mechanism mounted in said frame to extend beyond the same; a plurality of interference members adjustably disposed to operatively engage said shifting mechanism to successively dispose said friction wheels to operatively engage said driving wheel; and springs yieldingly supporting said interference members to exert therethrough an engaging pressure on said shifting mechanism.

2. A tractor as characterized, comprising a supporting frame; carrying wheels therefor; friction wheels; a plurality of shafts operatively connecting said friction and carrying wheels in paired relation; a shifting frame having bearings for said shafts; a driving mechanism for said carrying wheels, embodying a motor-driven shaft and a driving wheel operatively connected with said shaft to be rotated thereby continuously, said driving wheel being disposed between, and normally disengaged from, said friction wheels; a lever operatively connected with said shifting frame, pivotally mounted in, to extend beyond said frame; means carried by said lever to hold the same in operative position; and interference members disposed in the path of said tractor and said lever to throw said lever successively to opposite sides of a vertical plane coincident with the pivot of said lever.

3. A tractor as characterized, comprising a supporting frame; carrying wheels therefor, friction wheels; a plurality of shafts operatively connecting said friction and carrying wheels in paired relation; a shifting frame having bearings for said shafts; a driving mechanism for said carrying wheels, embodying a motor-driven shaft and a driving wheel operatively connected with said shaft to be rotated thereby continuously, said driving wheel being disposed between, and normally disengaged from, said friction wheels; a lever operatively connected with said shifting frame, pivotally mounted in, to extend beyond said frame; means carried by said lever to hold the same in operative position; interference members disposed in the path of said tractor and said lever to throw said lever successively to opposite sides of a vertical plane coincident with the pivot of said lever; and a locking spring to hold said lever in adjusted position.

4. A tractor as characterized, comprising a supporting frame; carrying wheels therefor; friction wheels; a plurality of shafts operatively connecting said friction and carrying wheels in paired relation; a shifting frame having bearings for said shafts; a driving mechanism for said carrying wheels, embodying a motor-driven shaft and a driving wheel operatively connected with said shaft to be rotated thereby continuously, said driving wheel being disposed between, and normally disengaged from, said friction wheels; a lever operatively connected with said shifting frame, pivotally mounted in, to extend beyond said frame; a weight carried by said lever to hold the same in operative position; interference members disposed in the path of said tractor and said lever to throw said lever successively to opposite sides of a vertical plane coincident with the pivot of said lever; and a spiral spring operatively connecting said shifting frame and lever at opposite sides of the pivot of said lever, to exert a pull on said lever in both operative positions, to supplement the pressure of said weight.

5. A track plate having a tractor as characterized, comprising a guide flange extending from the upper edge of said plate; a channel conduit mounted in said plate in substantially parallel relation to said guide flange; a cover for said conduit to close the front thereof and form a tortuous entrance thereto; a plurality of metallic electric conductors mounted in said conduit in spaced relation; a tractor having a supporting frame; a driving mechanism for said tractor, embodying driving wheels mounted on said track plate and an electric motor mounted on said supporting frame; and a boot mounted on said frame to extend within said conduit, and shaped to avoid the cover of said conduit, said boot being a conveyer of electric supply wires for said motor.

In testimony whereof I have signed my name to this specification in the presence of two subscribing witnesses.

MORTON P. SARFATY.

Witnesses:
 E. T. MURDOCK,
 PHILIP D. ROLLHAUS.

Copies of this patent may be obtained for five cents each, by addressing the "Commissioner of Patents Washington, D. C."